(12) United States Patent
Thakkar et al.

(10) Patent No.: US 11,372,561 B1
(45) Date of Patent: Jun. 28, 2022

(54) TECHNIQUES FOR IDENTIFYING MISCONFIGURATIONS AND EVALUATING AND DETERMINING STORAGE TIER DISTRIBUTIONS

(71) Applicant: EMC IP Holding Company LLC, Hopkinton, MA (US)

(72) Inventors: Bina K. Thakkar, Cary, NC (US); Ashish A. Pancholi, Cary, NC (US); David C. Waser, Holly Springs, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 27 days.

(21) Appl. No.: 17/112,345

(22) Filed: Dec. 4, 2020

(51) Int. Cl.
*G06F 3/06* (2006.01)

(52) U.S. Cl.
CPC .......... *G06F 3/0631* (2013.01); *G06F 3/0611* (2013.01); *G06F 3/0685* (2013.01)

(58) Field of Classification Search
CPC ..... G06F 3/0611; G06F 3/0685; G06F 3/0631
See application file for complete search history.

(56) References Cited

U.S. PATENT DOCUMENTS

| | | | |
|---|---|---|---|
| 2013/0067187 A1* | 3/2013 | Moss | G06F 12/0223 711/170 |
| 2019/0166024 A1* | 5/2019 | Ho | H04L 43/0823 |

OTHER PUBLICATIONS

Zakaria Jaadi, "A Step by Step Explanation of Principal Component Analysis," Sep. 4, 2019, https://builtin.com/data-science/step-step-explanation-princpal-compone, builtin Expert Contributor Network.

Wikipedia, "Principal component analysis," Dec. 1, 2020, https://en.wikipedia.org/wiki/Principal_component_analysis.

EMC, "EMC Unity: Fast Technology Overview," Dec. 2016, White Paper.

DELLEMC, CLOUDIQ Detailed Review, "A Proactive Monitoring and Analytics Application for Dell EMC™ Storage Systems," Oct. 2018, White Paper.

Dell Techologies, "Dell EMC Unity: Best Practices Guide," Mar. 2020.

* cited by examiner

*Primary Examiner* — Chie Yew
(74) *Attorney, Agent, or Firm* — Muirhead & Saturnelli, LLC

(57) ABSTRACT

Determining drive configurations may include: receiving a data set including tier distributions for data storage systems; applying principal component analysis to the data set to generate a resulting data set having number of dimension in comparison to the data set; determining clusters using the resulting data set, wherein each cluster includes a portion of the tier distributions, wherein each cluster has an associated cluster tier distribution determined in accordance with the portion of the tier distributions in the cluster; selecting one of the clusters; and performing first processing that determines, in accordance with a storage capacity requirement and in accordance with a corresponding cluster tier distribution of the selected one cluster, a drive configuration.

18 Claims, 8 Drawing Sheets

|  | Capacity 716a | Extreme 716b Performance | Performance 716c |
|---|---|---|---|
| Cluster 3 702 | 85.32% | 6.25% | 8.42% |
| Cluster Capacity 704 | 100 * 0.8532 =85.32 TB 704a | 100 * 0.0625 =6.25 TB 704b | 100 * 0.0842 =8.42 TB 704c |
| # of drives 706 | 85.32/2 =42.66 =43 drives 706a | 6.25/1.6 =3.9 =4 drives 706b | 8.42/1.8 =4.7 =5 drives 706c |
| RAID Group rule adjustment 708 | 48+16 = 64 drives 708a | 4+1 = 5 drives 708b | 8+2 = 10 drives 708c |
| Hot spare rule adjustment 710 | 3 drives 710a | 1 drive 710b | 1 drive 710c |
| Total drives 712 | 67 drives 712a | 6 drives 712b | 11 drives 712c |
| Theoretical Maximum IOPS 714 | 48 * X 714a | 4 * Y 714b | 8 * Z 714c |

TECHNIQUES FOR IDENTIFYING MISCONFIGURATIONS AND EVALUATING AND DETERMINING STORAGE TIER DISTRIBUTIONS

BACKGROUND

Technical Field

This application generally relates to data storage.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for determining drive configurations comprising: receiving a data set including a plurality of tier distributions for a plurality of data storage systems; applying principal component analysis to the data set to generate a resulting data set, wherein the data set has a first number of dimensions and the resulting data set has a second number of dimensions less than the first number of dimensions; determining a plurality of clusters using the resulting data set, wherein each of the plurality of clusters includes a portion of the plurality of tier distributions, wherein each of the plurality of clusters has an associated cluster tier distribution determined in accordance with the portion of the plurality of tier distributions in said each cluster; selecting one cluster of the plurality of clusters; and performing first processing that determines, in accordance with a storage capacity requirement and in accordance with a corresponding cluster tier distribution of the selected one cluster, a drive configuration. Each of the plurality of data storage systems may include at least two storage tiers of physical storage devices. At least some of the plurality of data storage systems may include a first plurality of storage tiers comprising rotating disk drives and non-volatile solid state storage devices (SSDs). At least some of the plurality of data storage systems may include a second plurality of storage tiers and wherein each tier of the second plurality of tiers includes SSDs. Each of the plurality of tier distributions may be associated with a corresponding one of the plurality of data storage systems, and wherein said each tier distribution may specify a percentage of each of a plurality of storage tiers of said corresponding one of the plurality of data storage systems. The plurality of clusters may have a plurality of corresponding cluster tier distributions. Each of the plurality of corresponding cluster tier distributions may specify a plurality of percentages for a plurality of storage tiers. Each of the plurality of percentages may denote a percentage of one of the plurality of storage tiers.

In at least one embodiment, processing performed may include determining a first expected I/O workload capability of the drive configuration; and determining whether the first expected I/O workload capability meets a specified I/O workload requirement. Responsive to determining the first expected I/O workload capability meets the specified I/O workload requirement, the drive configuration may be recommended for a data storage system. Processing performed may include determining whether the drive configuration is in accordance with one or more requirements of a specified model of data storage system. The one or more requirements may include a requirement specifying a maximum number of allowable physical storage devices in a data storage system having the specified model. The drive configuration may include a first number of physical storage devices of a first storage tier and a second number of physical devices of a second storage tier different from the first storage tier.

In at least one embodiment, processing performed may include determining an initial number of physical storage devices in each of a plurality of storage tiers in accordance with the storage capacity requirement; and determining a revised number of physical devices in each of the plurality of storage tiers, wherein said determining the revised number includes adjusting the initial number of physical storage devices in each of the plurality of tiers in accordance with one or more spare rules and one or more RAID group rules.

In at least one embodiment, the drive configuration may be determined responsive to an occurrence of one of a plurality of trigger conditions. The plurality of trigger conditions may include a trigger condition specifying to reconfigure an existing tier distribution of an existing data storage system when the existing tier distribution is determined to be non-optimal. The existing tier distribution may be determined to be non-optimal if it includes a percentage for a storage tier and the percentage is not at least a specified minimum percentage. The plurality of trigger conditions may include a trigger condition specifying to reconfigure an existing tier distribution of an existing data storage system when a lowest performance tier of a plurality of tiers of the existing data storage system is determined to be overloaded.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
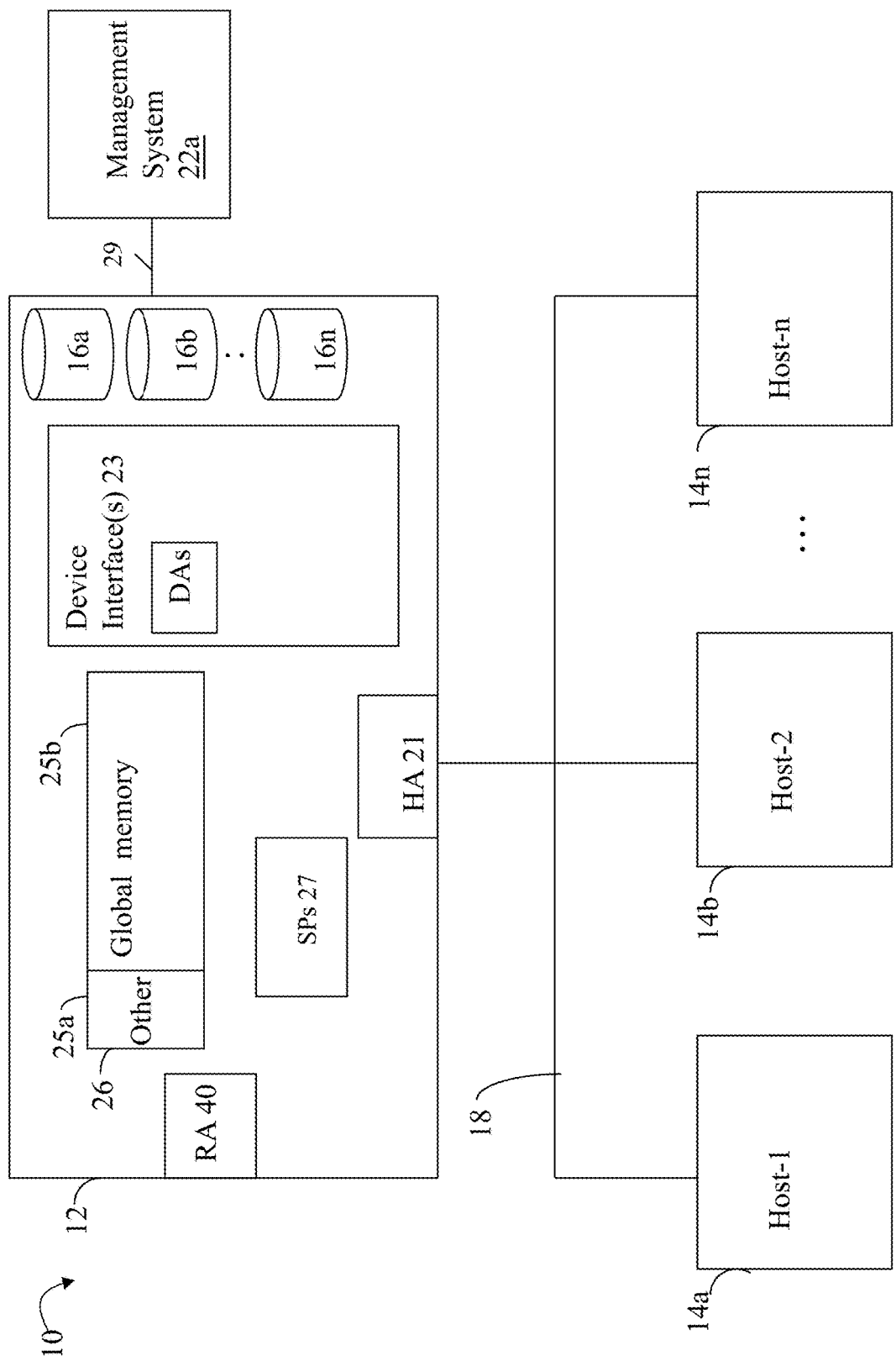
FIGS. 1 and 3 are examples of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS (Network File System)), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating or spinning hard disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts and also provides for persistent or non-volatile data storage. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. In some embodiments, the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In at least one embodiment, a LUN may be a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. Thus, an access of the logical storage space of the thin LUN results in either a null pointer (or equivalent) indicating that no corresponding physical storage space has yet been allocated, or results in a reference to a data device which in turn references the underlying physical storage space.

Thin LUNs and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16*a*-16*n*. In the following description, data residing on a LUN may be accessed by the device interface following a data request in connection with I/O operations. For example, a host may issue an I/O operation which is received by the HA 21. The I/O operation may identify a target location (e.g., logical address) from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system.

For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22*a* to the data storage system 12.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22*a* to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with the techniques herein may perform different data processing operations or services on data stored on the data storage system. For example, the data storage system may perform one or more data reduction operations, such as data deduplication and compression/decompression. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with the techniques herein. Data deduplication generally refers to removing redundant or duplicate data portions. Data deduplication techniques may include looking for duplicate data blocks whereby only a single instance of the data block is retained (stored on physical storage) and where multiple pointers or references to the single stored instance of the data block may be used in connection with the multiple references to the same unique data block.

Figure 2:
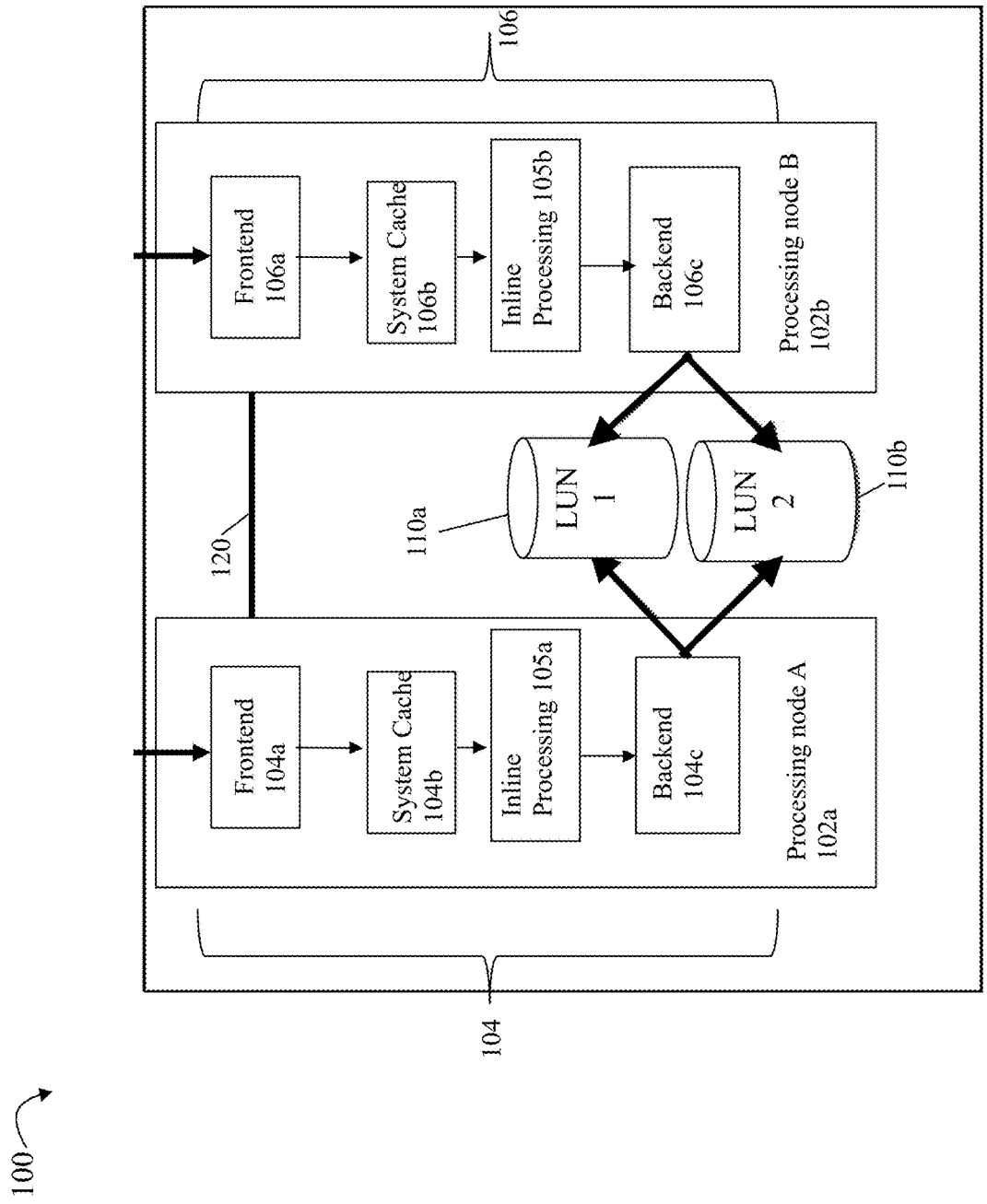
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processor nodes A 102*a* and B 102*b* and associated software stacks 104, 106 of the data path where I/O requests may be received by either processor node 102*a* or 102*b*. In the example 200, the data path 104 of processor node A 102*a* includes: the frontend (FE) component 104*a* (e.g., an HA, FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and permanent non-volatile storage (e.g., back end physical non-volatile storage devices accessed by BE components such as DAs as described herein). During movement of data in and out of the system cache layer 104*b* (e.g., such as in connection with read and writing data respectively, to physical storage 110*a*, 110*b*), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing data deduplication, compression/decompression, other data services. More generally, the inline processing may include performing any suitable or desirable data processing operations as part of the I/O or data path.

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b.

In connection with the inline processing layer 105a, prior to storing the original data on the physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a block) of the original data is a duplicate of an existing data portion already stored on 110a, 110b, that particular portion of the original data is not stored in a compressed form and may rather be stored in its deduplicated form (e.g., there is no need for compression of a block determined to be duplicate of another existing block). If the original data portion is not a duplicate of an existing portion already stored on 110a, 110b, the original data portion may be compressed and stored in its compressed form on 110a, 110b.

In connection with a read operation to read a block of data, a determination is made as to whether the requested read data block is stored in its original form (in system cache 104b or on physical storage 110a, 110b), or whether the requested read data block was previously deduplicated or compressed. If the requested read data block (which is stored in its original decompressed, non-deduplicated form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. If the requested read data block was previously compressed, the block is first decompressed prior to sending the read data block to the host. If the compressed read data block is already stored in the system cache, the data is uncompressed to a temporary or buffer location, the uncompressed data is sent to the host, and the buffer or temporary location is released. If the compressed read data block is not in the system cache but stored on the physical storage 110a, 110b, the compressed read data block may be read from the physical storage 110a, 110b into the system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage.

When the processor performs processing, such as in connection with the inline processing 105a, 105b as noted above, data may be loaded from the main memory and/or other lower cache levels into its CPU cache. In particular, inline data deduplication (ILD) and inline compression processing (ILC) may be performed as part of the inline processing 105a, 105b.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path.

Data storage systems may include different storage tiers having different types of backend non-volatile storage media, sometimes referred to herein as drives or BE PDs. For example, in at least one embodiment, the data storage system may include one or more tiers of rotating disk drives and include a tier of SSD drives (e.g., flash-based storage drives). In some embodiments, storage pools or pools may be defined within the data storage system. Each pool may be configured to include a portion of the system's drives from one or more of the storage tiers. For example, consider a data storage system with 3 storage tiers. A hybrid pool may be configured that includes drives from the 3 different tiers, where the drives from each particular tier may be configured as one or more RAID (Redundant Array of Inexpensive Disks or Redundant Array of Independent Disks) groups. A hybrid pool may also be configured that includes drives from 2 of the 3 tiers in the system, where the drives from each particular tier may be configured as one or more RAID groups. A pool may also be defined which includes drives from only a single one of the tiers configured as one or more RAID groups. In an embodiment using pools, the pools may be used to partition particular drives of particular tiers for use as resources by selected applications. Storage objects such as LUNs and files may have storage provisioned from a specified pool. A first application executing on the host may access data stored on a set of LUNs having storage provisioned from a particular pool. In this manner, the particular pool may include designated resources that are BE PDs for use only by the desired client, such as only the first application. In at least one embodiment, a hybrid pool may be defined as a storage pool that includes drives from at least two different storage tiers of drives of different types, where each such tier may include drives of only a single type, such as only 15K RPM drives.

In some embodiments, a data storage optimizer, such as the Dell EMC Unity Fully Automated Storage Tiering for Virtual Pools (FAST VP™) by Dell Inc., may automatically move or relocate data between different storage tiers within the same pool. FAST VP accelerates performance of a specific storage pool by automatically moving data within that pool to the appropriate tier based on data access patterns. FAST VP may be used with hybrid pools within the data storage system.

Thus, the data storage optimizer may proactively move or relocate data between different storage tiers. In particular, the data storage optimizer, may periodically remap portions of a file or LUN logical address space to keep the most actively used or accessed portions on slices of the highest performance tier in efforts to maximum data storage system I/O performance. To further illustrate, consider a multi-tiered storage system with 3 storage tiers—a first tier that is an SSD tier of flash-based drive, a second tier of 15K RPM or 10K RPM rotating disk drives and a third tier of 7200 RPM rotating disk drives. The foregoing 3 storage tiers may be ranked based on performance where the first SSD tier may be ranked as the highest, the second tier of 15K or 10K RPM drives ranked second highest and the third tier of 7200 RPM drives ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be have decreased since the first point in time and may be relocated, via demotion, from the highest ranked SSD tier to a lower performing tier, such as the second tier of 10K or 15K RPM drives. At yet a third point in time subsequent to the second point in time, the data portion may be frequently accessed again and may be promoted to a higher performing tier (e.g., relocated from the second tier of 10K or 15K RPM drives to the first SSD tier). In at least one embodiment, the data storage system may include multiple SSD tiers of non-volatile storage where each of the SSD tiers has different characteristics that affect latency when accessing the physical storage media to read or write data.

When reviewing the access patterns for data within a system, most access patterns show a basic trend. Typically the data is most heavily accessed near the time it was created, and the activity level decreases as the data ages. This trending is also referred to as the lifecycle of the data. The data storage optimizer monitors the data access patterns of data within pools on the system, and dynamically matches the performance requirements of the data with drives of particular tiers that provide that different levels of performance. In at least one embodiment, the 3 storage tiers may be further defined and referred to as follows:

1. Extreme Performance Tier—This tier includes all flash drives and is analogous to the first tier noted above.

2. Performance Tier—This tier includes all Serial Attached SCSI (SAS) drives, such as the 10K RPM or 15K RPM drives of the second tier noted above.

3. Capacity Tier—This tier includes all Near-Line SAS (NL-SAS) drives, such as the 7200 RPM drives of the third tier noted above.

It should be noted that the particular drives of the tiers and the particular number of tiers in an embodiment may vary from those described herein for purposes of illustration.

In some embodiments, the data storage system may provide support for both block and file storage. Block LUNs, file systems, and other storage objects such as datastores used for virtual machines can all exist within a single hybrid pool under the control and management of the data storage optimizer. Tier policies may be defined for each storage object, such as each LUN, file system, and the like. The tier policy settings for a storage object may have a default setting that may be modified by a user configuring the storage object. The tier policy options for a storage object, such as a LUN, may identify the policy to be used by the data storage optimizer for the LUN. Thus, the optimizer performs data movements or relocations for a data portion based on the I/O activity level of the data portion as well as the tier policy settings in effect for the LUN or other storage object including the data portion. In at least one embodiment, the tier policy setting may be one of several predefined options including: start high then auto-tier, auto-tier, highest available tier, and lowest available tier.

In at least one embodiment, the default and recommended policy setting for all storage objects (e.g., LUNs and files) is start high then auto-tier. This policy setting places initial allocations for the storage object in the highest tier available, and monitors activity to this storage object to determine the correct placement of data dynamically over time.

The tier policy setting of auto-tier provides for movement and placement of data among the tiers in a pool based on the activity level of the data portions. With auto-tier, the most active data portions are placed on the highest performance tier while placing less active data on lower tiers of the pool.

With the tier policy setting of highest available tier, slices used for storage objects with highest available tier setting are taken from the highest tier with available space when slices are needed. Slices for storage objects with the highest available tier setting always take top tier priority over other tier policy setting. With the highest available tier setting, if the highest tier in the pool does not have any space, space from the next tier with available space will be taken. Additionally, existing slices on the highest tier of a pool have priority over new slices being consumed for storage objects with the highest available tier setting. New slice allocations do not immediately force slices out of the highest tier regardless of the tiering policy set on the resource. When multiple storage objects have the highest available tier setting, and there is not enough space within the top tier to store all data portions, the data portions compete for top tier placement based on each data portion's activity level or temperature.

With the tier policy setting of lowest available tier, new slices for a resource are assigned from the lowest tier with free capacity. This policy setting is recommended for storage objects that are not performance sensitive or response time sensitive. Regardless of the activity level for the slices assigned to storage objects with the lowest available tier policy setting, all slices will remain in the lowest available tiers. If the lowest tier within a pool does not have free capacity, all slices for resources with this tiering policy assigned will be compared. The slices with the lowest activity will have priority to reside on the lowest tier of the pool.

In some existing systems, a user or customer, such as the data storage manager or administrator, may set tier policies for various storage objects which do not adhere to the recommended best practices. For example, as noted above, the recommended best practice may be to set the tier policy for each storage object to start high then auto-tier. However, in contrast to the recommended best practice, the customer may have a large number or large overall percentage of storage objects with an assigned tier policy setting other than the recommended best practice tier policy setting. For example, the customer may have a large number or percentage of storage objects with an assigned tier policy setting of the highest available tier. As a variation, the customer may have a large number or percentage of storage objects with an assigned tier policy setting of, for example, the lowest available tier. Additionally, the customer or user may also not follow recommended best practices regarding the minimum amount of recommended flash tier or extreme performance tier. For example, the recommended best practices may specify that each pool have at least 5% of the its storage capacity from the flash tier or extreme performance tier. Thus, the recommended best practices extended to the entire data storage system may specify that the data storage system have at least 5% of its storage capacity from the flash tier or extreme performance tier. Generally, having a misconfigured data storage optimizer and/or a misconfigured data storage system such as with a misconfigured storage tier distribution that does not follow recommended best practices such as those noted above may result in sub-optimal I/O performance. In particular, a misconfigured tier distribution may hinder the data storage optimizer from effectively providing optimal or improved data storage system performance.

Additionally, the process of determining the particular storage tiers as well as the size of each tier (e.g., the per tier storage capacity and number of drives of each tier) for a customer's data storage system configuration is a difficult problem. Determining proper tier sizing requires the sales engineer or customer determining the configuration to be very knowledgeable about the different application I/O workloads and the tradeoffs between various dimensions such as performance and cost. As a result, a data storage system may be misconfigured with an unsuitable or improper storage tier configuration for the particular I/O workload of the applications storing data on the data storage system. As a result of the misconfigured data storage system due to the improper storage tier configuration and distribution, there may be adverse costs incurred in terms of customer dissatisfaction, reduced data storage system performance (e.g., unacceptably large I/O response times) and increased support costs. The increased support costs may be due, for example, to the additional trouble shooting needed in connection with diagnosing a cause for the reduced I/O performance and providing acceptable solutions to increase I/O performance and customer satisfaction.

Described in the following paragraphs are techniques that may be used to detect misconfigurations such as in connection with the data storage optimizer as well as in connection with the existing tier configuration and distribution of a data storage system. Additionally, described are techniques that may be used to determine one or more recommended tier distributions for a customer's data storage system. In at least one embodiment, data may be collected from multiple data storage systems of multiple customers to perform cross customer analysis. In at least one embodiment, the data may be collected using a cloud-based management application. The collected data from the multiple customer data storage systems may be used to determine the one or more recommended tier distributions from which a selection may be made.

In at least one embodiment, determining the one or more recommended tier distributions may be include analyzing and aggregating the collected data regarding the currently existing tier distributions of existing data storage system configurations of existing customer data storage systems. The currently existing tier distributions may be determined from the information collected by the cloud-based management application for data storage systems of multiple customers. In at least one embodiment, the current existing tier distributions for existing customer pools may form an original data set that is explored and understood by applying principal component analysis (PCA) to reduce feature dimensionality. In at least one embodiment, the original data set may be based on collected data for hybrid pools of multiple different storage tiers. In at least one embodiment, an existing tier distribution may be determined for each data storage system for which data is collected based on the hybrid pools of the data storage system. Applying PCA to the original data set may result in a second data set with reduced features, where the second data set has a reduced number of dimensions in comparison to the original data set.

The second data set may be further analyzed to determine an optimal number of clusters of tier distributions. An unsupervised machine learning technique, such as a clustering algorithm, may be used to group the existing tier distributions based on the hybrid pools into the optimal number of clusters. In at least one embodiment, the clustering algorithm may be the K-means clustering algorithm. In at least one embodiment, a technique such as the elbow technique may be used to determine an optimal number of clusters of tier distributions. The hybrid pools may be existing pools of data storage systems for which data was collected using the cloud-based management application. From the data collected for such hybrid pools for each data storage system, processing may be performed to determine the existing tier distribution for the data storage system. A tier distribution may include a percentage for each tier denoting the percentage of the tier with respect to the overall storage capacity across all tiers. The clusters formed by the clustering algorithm may represent similar tier distributions among at least several data storage systems from different customers (e.g., based on the existing tier distributions of multiple data storage systems of multiple customers). Each cluster may have an associated tier distribution based on the individual tier distributions included in the cluster.

In at least one embodiment, the tier distributions of the clusters may be used to provide candidate tier distributions for further evaluation and consideration by a customer when the customer wants to configure or reconfigure a data storage system by determining a new tier distribution for the data storage system. In at least one embodiment, the customer provides a desired storage capacity for the data storage system configuration. Based on the storage capacity, processing may be performed using a selected one or more of the candidate tier distributions to determine, for each cluster having an associated tier distribution, a potential drive count and potential maximum theoretical I/O workload capability such as in IOPS (e.g., I/Os per second). Thus, the number of candidate tier distributions may be equal to the number of clusters previously discovered using the clustering algorithm in accordance with existing tier distributions of multiple data storage systems across multiple customers.

In at least one embodiment, the customer may also provide I/O workload information such as regarding the expected total I/O workload of the data storage system at a point in time. The I/O workload information may denote, for example, an average sustained I/O workload expected or estimated for the data storage system. In at least one embodiment, those candidate tier distributions having a potential maximum theoretical I/O workload capability that is less than the expected total I/O workload provided by the customer may be removed as a candidate. In at least one embodiment, those candidate tier distributions having a potential maximum theoretical I/O workload capability that is equal to or greater than the expected total I/O workload provided by the customer may be considered for further evaluation and remain on the list of candidates.

In at least one embodiment, the candidate tier distributions may be further evaluated based on the expected I/O workload profile of customer applications and thus expected usage of the data storage system. For example, consider a data storage system used primarily for storing backups. The applications may be primarily backup applications storing backup data on the system where the backup applications are not sensitive to performance. In this case, there may be multiple candidate tier distributions each having a potential or predicted maximum theoretical I/O workload capability sufficient to handle the expected I/O workload of the backup applications. However, for other reasons such as cost considerations, a customer may select a candidate tier distribution which meets the I/O workload requirements of the backup application and has the minimum overall cost of all such candidates meeting the I/O workload requirements. The selected candidate tier distribution meeting the I/O workload requirements may also have the minimum overall cost. For example, the selected candidate tier distribution may have the minimum percentage of flash for the extreme performance tier with respect to all candidates and/or may have the maximum percentage of the capacity tier with respect to all candidates.

The foregoing as well as other aspects of the techniques herein are described in more detail in the following paragraphs.

Examples are provided in the following paragraphs which may refer to a particular number of storage tiers comprising both flash and rotating hard disk drives (HDDs). However, more generally the techniques herein may be used in connection with any suitable number of storage tiers comprising drives with different performances characteristics and capabilities. For example, the techniques herein may also be used in an embodiment having all/only non-volatile SSDs. In this case, the non-volatile SSDs may comprise multiple tiers of non-volatile SSDs having different performance characteristics and capabilities. For example, the multiple storage tiers may include only multiple tiers of different grades of flash drives such as a first tier of SLC drives and a second tier of MLC drives. Other suitable non-volatile SSDs known in the art may also be included in the multiple storage tiers of a data storage system.

As used herein, a tier distribution, such as for a pool or a data storage system, may include a percentage for each tier in the pool or data storage system. For example, assume the pool or system has 3 tiers. The tier distribution for the pool or system may be denoted by a vector of 3 percentages totaling 100%. For example, a tier distribution of 10%, 50%, 40% for a system denotes, respectively, that 10% of the system's capacity is tier 1 storage, 40% of the system's capacity is tier 2 storage, and 40% of the system's capacity is tier 3 storage.

Figure 3:
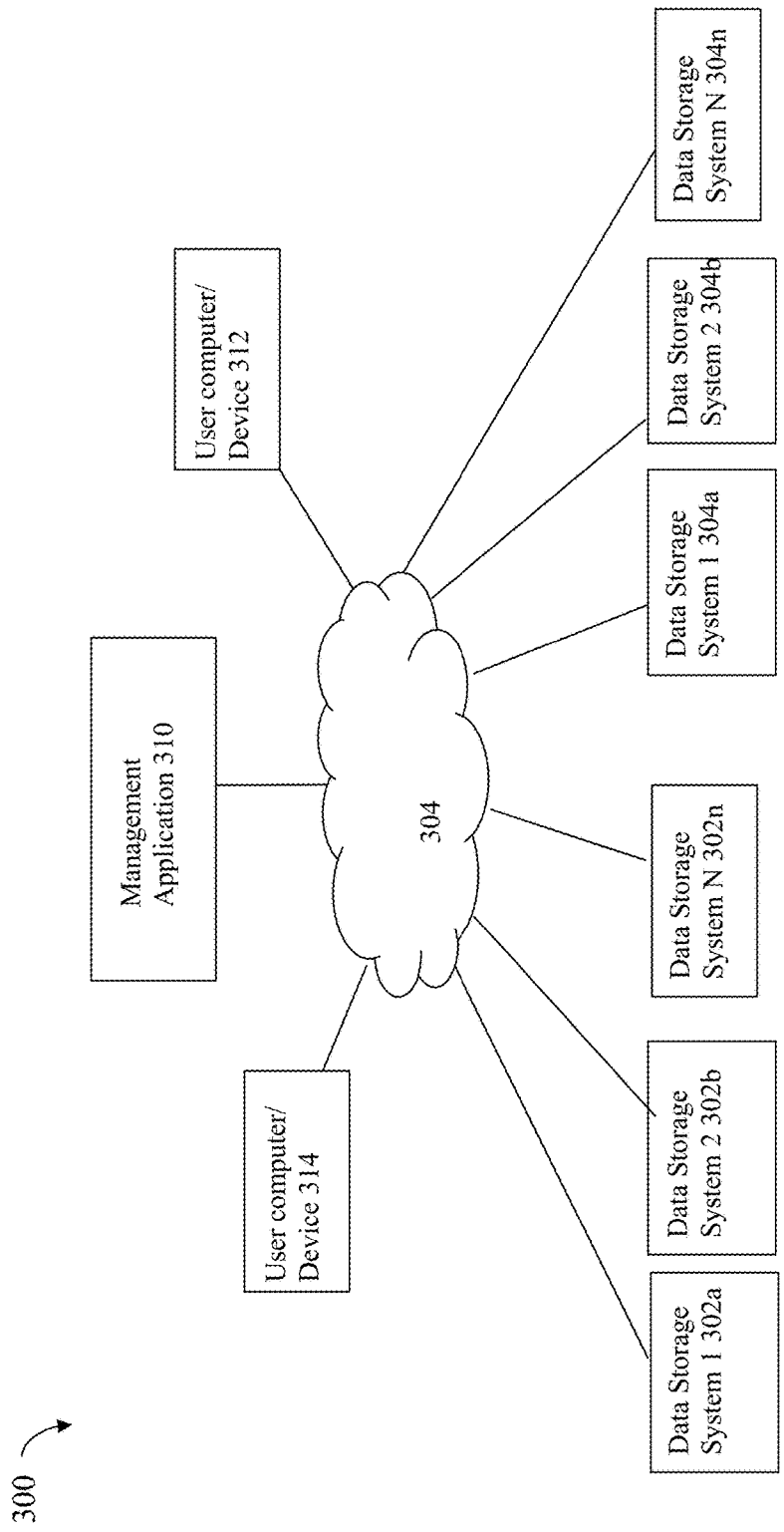

Referring to FIG. 3, shown is an example of components that may be used in an embodiment in accordance with techniques herein. The example 300 includes a management application 310, user computer or devices 312, 314, a network 304, and data storage systems 302a-n and 304a-n. The network 304 may be, for example, the internet to which the other illustrated components in the example 300 connect to for network connectivity. The data storage systems 302a-n and 304a-n may be data storage arrays or other system providing data storage such as described herein. The data storage systems 302a-n may be a first set of data storage systems of a single first customer where each of the systems 302a-n may be located geographically at various data centers and sites across the United States, and possibly other countries. The data storage systems 304a-n may be a second set of data storage systems of a single second customer where each of the systems 304a-n may be located geographically at various data centers and sites across the United States, and possibly other countries.

In at least one embodiment, the management application 310 may be a cloud-based management application that receives various types of data from the systems 302a-n, 304a-n. The management application 310 may analyze the received data and provide information to a data storage customer, such as a storage manager or administrator. In at least one embodiment, the management application 310 may be a Software-as-a-Service (SaaS) cloud-based application accessible by users through devices 312, 314 connected to the management application 310 through the internet 304. The devices 312, 314 may be computer systems, tablets, phones, or more generally any suitable device that has at least one processor, connectivity to the network 804 and executes a browser or other client-side software providing access to the management application 310. For example, in at least one embodiment, the management application 310 may be Dell EMC CloudIQ™ that is a cloud-based storage analytics application providing customers with access through an interface or portal. In at least one embodiment, a web browser executing on the devices 312, 314 of users, such as data storage managers or administrators, may be used to connect to the management application 310 to view information presented by the management application about the particular user's data storage systems.

The management application 310 may, for example, provide each customer with various metrics that the customer may view to monitor performance and other aspects of the customer's one or more data storage system. For example, the first customer may use the management application 310 to view various metrics regarding the first customer's systems 302a-n, and the second customer may use management application 310 to view various metrics regarding the second customer's systems 304a-n. The management application 310 may, for example, provide various metrics, status information, and the like, regarding performance, capacity, protection, and configuration of each customer's data storage systems based on collected data. The information provided may be used for various management tasks such as, for example, proactive monitoring and management to understand and identify problems. For example, the management application 310 may provide a customer with information regarding available storage capacity in configured storage pools; identify which storage pools and which data storage systems have the most available capacity; identify which systems and/or storage pools may be nearly out of space, provide an estimated prediction as to when a storage pool and/or data storage system may exhaust available capacity; identify which systems, storage pools or other storage entities have compression enabled and in use; provide performance metrics in order to identify different storage entities (e.g., LUNs, backend storage devices, pools, RAID groups) which have the best performance, worst performance, are not meeting specified performance targets or goals; and the like.

Periodically, data may be collected from the systems 302a-n and 304a-n which may be sent, via the network 304, to the management application 310 for analysis and processing. In at least one embodiment in which the management application 310 is the CloudIQ™ management application, particular types of data may be collected from the storage systems 302a-n, 304a-n at different frequencies. Some information, such as performance related information, may be collected more frequently than other information. Due to the frequency of data acquisition and also the large number of customers and data storage systems that may be providing the data to the management application 810, there may be large amounts of data collected and processed by the management application 810.

In at least one embodiment in accordance with the techniques herein, the information collected from the multiple customer data storage systems by the management application 310 may be used or repurposed for performing the techniques described herein.

Data collected regarding the data storage systems by the management application 310 may include the tier policy settings for all storage objects, such as all LUNs and files, for each hybrid pool. As described elsewhere herein, tier policies for storage objects, such as LUNs, may be used by the data storage optimizer to automatically and continuously move data portions between the different storage tiers based on the changing activity or I/O workload of the data portions over time. Each tier policy setting for a storage object may be evaluated to determine whether it meets specified best practices for use with the data storage optimizer. For example, in at least one embodiment, the specified best practices may indicate that the tier policy setting should be start high then auto-tier as discussed elsewhere herein. If any tier policy has a setting that does not meet best practices by having a setting other than start high then auto-tier, a notification may be provided to the customer, such as through the management application interface. The notification may suggest or recommend that the customer reconfigure the tier policy to have a setting that meets the best practices.

Data collected regarding the data storage systems by the management application 310 may include the per tier storage capacity for each hybrid pool in each of the data storage systems.

In at least one embodiment processing may be performed to determine a tier distribution for each hybrid pool using the pool's storage capacity information and then determine whether each pool's tier distribution meets specified best practices. For example, a data storage system may include 2 hybrid pools for the following 3 storage tiers as discussed elsewhere herein: the Extreme Performance Tier (also referred to as tier 1), the Performance Tier (also referred to as tier 2), and the Capacity Tier (also referred to as tier 3). Pool A may have the following tier capacities: tier1=M1 GB (gigabytes); tier 2=M2 GB; tier 3=M3 GB. Pool B may have the following tier capacities: tier1=N1 GB (gigabytes); tier 2=N2 GB; tier 3=N3 GB. The tier distribution for Pool A may be determined by first calculating the total capacity of Pool A. In the foregoing example, this total capacity of Pool A may be expressed as M1+M2+M3. Now a percentage (%) may be determined for each tier of Pool A by dividing the tier capacity by the total capacity of Pool A. In the foregoing example, the % of tier 1=(M1)/total capacity of Pool A, the % of tier 2=(M2)/total capacity of Pool A, and the % of tier 3=(M3)/total capacity of Pool A. The tier distribution for Pool A may be denoted by the foregoing 3 percentages. In a similar manner, the tier distribution for Pool B may be determined.

Each hybrid pool's tier distribution may be evaluated to determine whether it meets specified best practices. For example, in at least one embodiment, the specified best practices may indicate that tier 1, denoting the extreme performance or flash tier, should be at least a specified minimum percentage such as 5% in the per pool tier distribution. If any hybrid pool has a tier 1% that is less than the specified minimum, a notification may be provided to the customer, such as through the management application interface. The notification may suggest or recommend that the customer reconfigure the hybrid pool(s) having a tier 1% that is less than the specified minimum.

In at least one embodiment, tier performance may be evaluated using workload information collected by the management application 310 to determine whether a data storage system has a misconfigured or sub-optimal tier distribution. If so, then a recommendation may be made to the customer to re-evaluate and reconfigure the current tier distribution for the data storage system. To evaluate tier performance, the BE I/O workload, such as in IOPS may be obtained. The BE I/O workload in IOPS denotes the I/O rate per second regarding I/Os issued to the BE PDs of tier 3. Additionally, workload information may be obtained regarding the individual PDs of the capacity tier or tier 3.

Figure 4:
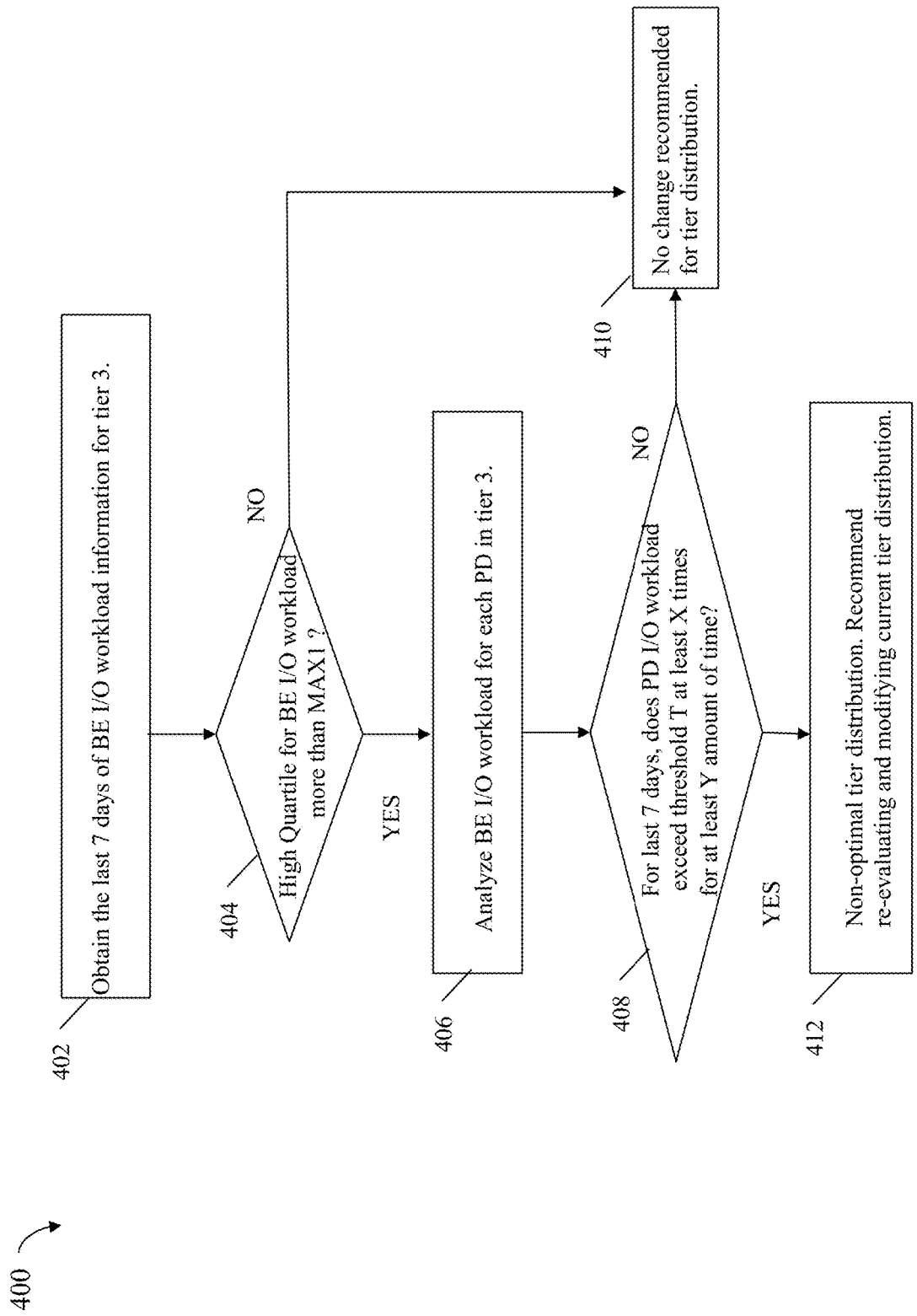
FIGS. 4, 5 and 8 are flowcharts of processing steps that may be performed in an embodiment in accordance with the techniques herein.

Referring to FIG. 4, shown is a flowchart 400 of processing steps that may be performed to evaluate tier performance of a data storage system in an embodiment in accordance with the techniques herein. At the step 402, the BE I/O workload information for the last 7 days for tier 3, or more generally the lowest ranked performance tier, may be obtained with respect to the data storage system. It should be noted that although a time period of 7 days is specified in the step 402 for illustration, more generally any suitable time period may be used. From the step 402, control proceeds to the step 404.

At the step 404, a determination may be made as to whether the high quartile of the BE I/O workload for tier 3 of the data storage system exceeds a specified maximum MAX1. A quartile is a statistical term that describes a division of observations into four defined intervals based on the values of the data and how they compare to the entire set of observations. Generally, the data is arranged from smallest to largest: First quartile: the lowest 25% of numbers. Second quartile: between 25.1% and 50% (up to the median) Third quartile: 51% to 75% (above the median) Fourth quartile: the highest 25% of numbers. In connection with the step 402 in at least one embodiment, an average BE I/O workload may be determined based on the high quartile corresponding to the top 25% of the highest BE I/O workloads observed during the last 7 days. The average BE I/O workload may be compared to MAX1 in the step 404. If the average BE I/O workload is more than MAX1, the step 404 evaluates to yes, and otherwise the step 404 evaluates to yes.

In connection with the step 404, MAX1 may be a threshold associated with an overloaded I/O workload of tier 3 when the threshold MAX1 is exceeded. MAX1 is with respect to the entire tier 3. MAX0 may be a threshold denoting an overloaded I/O workload of a single tier 3 PD. In at least one embodiment, MAX1 may be determined in accordance with NUM, the number of PDs in tier 3, and MAX0. In particular MAX1 may be determined as the mathematical product of NUM*MAX0. Generally, MAX1 and MAX0 may be determined in any suitable manner. For example, in at least one embodiment, each tier 3 PD may be capable of a peak I/O rate such as a peak number of IOPS denoting saturation. A PD of tier 3 may be characterized as overloaded (e.g., where response times may be unacceptable) if its BE I/O workload exceeds a specified percentage of its peak I/O rate. For example, a PD of tier 3 may be characterized as overloaded if its BE I/O workload exceeds 80% of its peak I/O rate. In this case, MAX0 may be determined as a specified percentage of the PD's peak I/O rate. If the step 404 evaluates to no, control proceeds to the step 410 where no change may be recommended to the tier distribution for the data storage system being evaluated. If the step 404 evaluates to yes, control proceeds to the step 406.

At the step 406, processing may be performed to obtain and analyze the BE I/O workload for each PD in tier 3. From the step 406, processing proceeds to the step 408. At the step 408, processing is performed to determine whether for last 7 days (or other suitable time period), does the PD I/O workload of any PD in tier 3 exceed threshold T at least X times for at least Y amount of time? T, X and Y may be any suitable threshold conditions or values. For example, T may denote a number of IOPS, X may be an integer such as 3, and Y may denote a minimum time duration, such as 1 hour or 15 minutes. In at least one embodiment, T may be equal to MAX0, denoting an overloaded I/O workload for a tier 3 PD. If the step 408 evaluates to no, control proceeds to the step 410. If the step 408 evaluates to yes, control proceeds to the step 412. At the step 412, a determination is made that the current tier distribution of the data storage system being evaluated is non-optimal. A recommendation may be made to the customer in the step 412 to re-evaluate and modify the current tier distribution.

The flowchart 400 of FIG. 4 describes processing for determining whether an existing tier distribution in a data storage system is non-optimal. In response to determining the existing tier distribution is non-optimal, a recommendation may be made to re-evaluate and modify the current tier distribution of the data storage system. The flowchart 400 provides one way in which a determination regarding a non-optimal tier distribution may be made. The flowchart 400 makes such a determination by examining the BE I/O workload of the lowest performance tier, tier3, the capacity tier. If the tier 3 is determined as overloaded (e.g., when the step 404 evaluates to yes) and if any single PD is determined as being overloaded for a sustained amount of time Y at least X times in the last 7 days (e.g., when the step 408 evaluates to true), then the current tier distribution of the data storage system being evaluated is determined to be non-optimal.

In at least one embodiment, a tier distribution may be determined for each data storage system using the storage capacity information for all hybrid pools in the data storage system. For example, a data storage system may include 2 hybrid pools for the following 3 storage tiers as discussed elsewhere herein: the Extreme Performance Tier (also referred to as tier 1), the Performance Tier (also referred to as tier 2), and the Capacity Tier (also referred to as tier 3). Pool A may have the following tier capacities: tier1=M1 GB (gigabytes); tier 2=M2 GB; tier 3=M3 GB. Pool B may have the following tier capacities: tier1=N1 GB (gigabytes); tier 2=N2 GB; tier 3=N3 GB. The tier distribution for the data storage system may be determined by calculating the total capacity across all pools for all tiers. In the foregoing example, this total capacity may be expressed as M1+M2+M3+N1+N2+N3. For each tier, determine a tier capacity across all pools in the system. In the foregoing example, the tier 1 capacity may be calculated as M1+N1, the tier 2 capacity may be calculated as M2+N2, and the tier 3 capacity may be calculated as M3+N3. Now a percentage (%) may be determined for each tier by dividing the tier capacity by the total capacity. In the foregoing example, the % of tier 1=(M1+N1)/total capacity, the % of tier 2=(M2+N2)/total capacity, and the % of tier 3=(M3+N3)/total capacity. The tier distribution for the data storage system may be denoted by the foregoing 3 percentages.

Each data storage system's tier distribution may be evaluated to determine whether it meets specified best practices.

For example, in at least one embodiment, the specified best practices may indicate that tier 1, denoting the extreme performance or flash tier, should be at least a specified minimum percentage such as 5% in the tier distribution of the data storage system. If the tier distribution of the data storage system has a tier 1% that is less than the specified minimum, a notification may be provided to the customer, such as through the management application interface. The notification may suggest or recommend that the customer re-evaluate and reconfigure the tier distribution for the data storage system.

Figure 5:
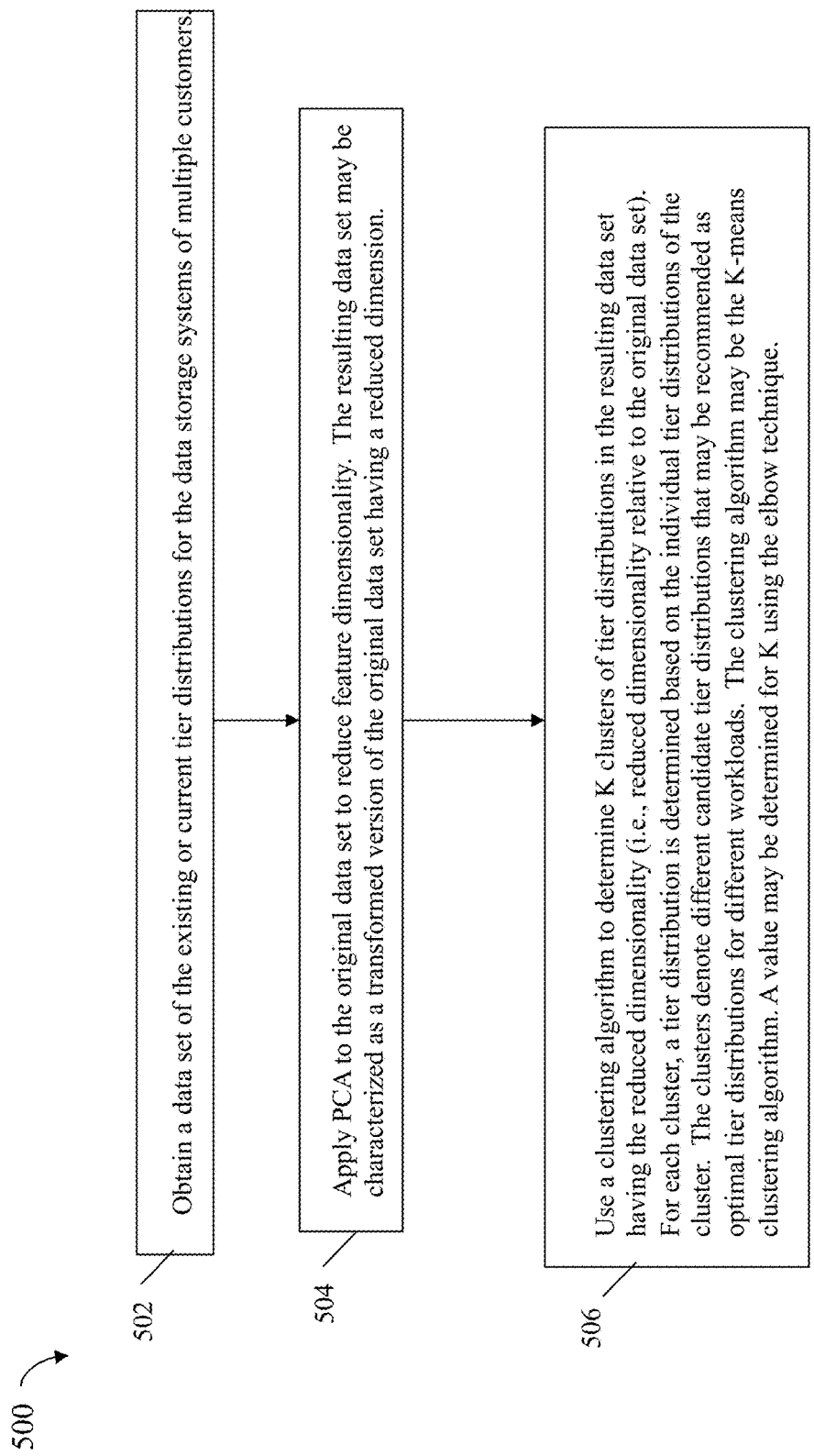

What will now be described with reference to the flowchart 500 of FIG. 5 are processing steps that may be performed to determine candidate tier distributions that may be provided as recommendations for optimal tier distributions to a customer that wants to configure a new data storage system or reconfigure an existing data storage system. Thus, the processing of FIG. 5 may be performed responsive to the occurrence of one or more trigger conditions. In at least one embodiment, the trigger conditions may include a determination that an existing tier distribution of a data storage system is non-optimal or misconfigured such as determined by the step 412 of FIG. 4. In at least one embodiment, the trigger conditions may include a determination that the existing tier distribution includes one or more percentages not in accordance best practices, such as determined by a percentage of tier 1 flash that is less than a specified minimum percentage as described above. The one more trigger conditions may include an on-demand request, such as by a user or customer, in connection with determining an initial tier distribution for a new data storage system or determining a reconfiguration of storage for an existing data storage system. The on-demand request may be made, for example, as a result of a user selection from an interface such as a menu selection from a graphical user interface (GUI) of the management application 310 of FIG. 3. More generally, the on-demand request may be made using any supported interface such as, for example, a command line interface or using a defined application programming interface (API).

At the step 502, a data set of the existing or current tier distributions for the data storage systems of multiple customers may be obtained. The data set may include the existing tier distributions of the data storage systems of multiple customers as described above. In at least one embodiment as discussed above, the data set may be determined based on data collected by the management application 310 of FIG. 3. From the step 502, control proceeds to the step 504.

At the step 504, processing may be performed to apply PCA to the original data set to obtain a resulting data set have a reduced feature dimensionality. The resulting data set may be characterized in one aspect as a transformed version of the original data set have a reduced dimension in comparison to the number of dimensions or variables of the original data set.

Consistent with other discussion herein, PCA is a method that may be used to reduce the dimensionality of a data set by transforming the original data set into a resulting data set having a smaller number of dimensions and variables yet still retains most of the information of the original larger data set. Reducing the number of variables of a data set comes at the expense of accuracy. Smaller resulting data sets of reduced dimensionality may be preferred over larger data sets of larger dimensions since the smaller resulting data sets are easier to explore, visualize and analyze such as in connection with subsequently applied machine learning techniques.

In at least one embodiment, PCA processing may include performing step S1 to standardize the range of the initial variables so that each one contributes equally to the analysis. The standardization performed by the step S1 may be characterized as transforming the data to comparable scales. Mathematically, the standardization may be performed with respect to the values in the data set for each single dimension or variable by subtracting the mean and dividing by the standard deviation for each value of each variable as expressed in the following

EQUATION 1:

$$z = \frac{value - mean}{standard\ deviation} \quad \text{EQUATION 1}$$

where for a variable (e.g., such as X or Y) denoting a single dimension, each "value" for that variable in the data set is normalized or standardized to a corresponding revised transformed value "z", where "mean" denotes the mean determined with respect to all "values" for the variable in the data set and "standard deviation" denotes the standard deviation determined with respect to the "mean" and all "values" for the variable in the data set.

Following the step S1, a step S2 of PCA may be performed to calculate the covariance matrix using the standardized values of the data set. The goal of the step S2 may be characterized as understanding how the variables of the data set are varying from the mean with respect to each other, or in other words, to see if there is any relationship between them. Variables in the data set may be highly correlated in such a way that they contain redundant information. So, in order to identify these correlations, the covariance matrix may be computed in the step S2.

As known in the art, the covariance matrix is a p×p symmetric matrix (where p is the number of dimensions in the original data set) that has as entries the covariances associated with all possible pairs of the initial variables. For example, for a 3-dimensional data set with 3 variables x, y, and z, the covariance matrix is a 3×3 matrix as follows:

$$\begin{bmatrix} Cov(x,x) & Cov(x,y) & Cov(x,z) \\ Cov(y,x) & Cov(y,y) & Cov(y,z) \\ Cov(z,x) & Cov(z,y) & Cov(z,z) \end{bmatrix}$$

where Cov(i, j) denotes a covariance determined with respect to the two variables, i, j, of the data set. A covariance is a measure of the joint variability of two variables. The sign of the covariance provides information regarding the correlations between two variables. If the sign covariance determined with respect to two variables is positive, then the two variables are correlated (e.g., increase or decrease together). If the sign covariance determined with respect to two variables is negative, then the two variables are inversely correlated (e.g., when one variable increases, the other variable decreases).

Following the step S2, a step S3 of PCA processing may be performed to compute the eigenvectors and eigenvalues of the covariance matrix. Eigenvectors and eigenvalues may then be used to determine the principal components of the data. As known in the art, each of the number of eigenvalues and the number of eigen vectors is equal to the number of dimensions or variables of the original data set. For example, if the original data set has 3 variables, as with the tier distribution percentages for 3 storage tiers, then the step S3 computes 3 eigen vectors and 3 eigen values. Computation of eigenvectors and eigenvalues is known in the art. In connection with PCA, the eigenvectors of the covariance matrix are the directions of the axes where there is the most variance or information denoting the principal components. The eigenvalues are the coefficients attached to eigenvectors, which denote the amount of variance carried in each principal component. Following the step S3, the step S4 of PCA processing may be performed to rank the eigenvectors in order of their eigenvalues, highest to lowest, to obtain the principal components ranked in order of decreasing significance.

Principal components are new variables that are constructed as linear combinations or mixtures of the initial variables of the original data set. These combinations are done in such a way that the new variables (i.e., principal components) are uncorrelated and most of the information within the initial variables is accounted for in the first principal component. An N-dimensional input data set results in N principal components, but PCA attempts to capture the maximum possible information (e.g., differences in the variances of the variables) in the first component, then the maximum remaining information in the second component, and so on. Organizing information in principal components in this manner provides a way to consider the principal components in a specified order to determine which one or more principal components may be discarded without losing much information. The undiscarded remaining principle components may be considered as the new variables of the resulting transformed data set of reduced dimensionality. Generally, principal components are less interpretable and don't have any real meaning since they are constructed as linear combinations of the initial variables of the original data set. In one aspect, principal components represent the directions of the data that explain a maximal amount of variance, and thus that capture most information of the data. The larger the variance captured by a principal component, the more captured by the principal component.

Principal components may be constructed so that the first principal component accounts for the largest possible variance in the data set. The second principal component is calculated in a similar manner, with the condition that it is uncorrelated with the first principal component and that it accounts for the next highest variance. The foregoing may be repeated until there are a total of N principal components where N denotes the number of variables or dimensions in the original data set.

As noted above, the eigenvalues are the coefficients attached to eigenvectors, which denote the amount of variance carried in each principal component. Ranking the eigenvectors in order of their eigenvalues, from highest to lowest, lists the principal components ranked in order of decreasing significance. As an example, consider a two dimensional original data set for simplicity of illustration with 2 variables x,y. Further, assume that the eigenvectors $v1$, $v2$ and eigenvalues $\lambda 1$ $\lambda 2$ of the covariance matrix are as follows:

$$v1 = \begin{bmatrix} 0.6778736 \\ 0.7351785 \end{bmatrix} \quad \lambda_1 = 1.284028$$

$$v2 = \begin{bmatrix} -0.7351785 \\ 0.6778736 \end{bmatrix} \quad \lambda_2 = 0.04908323$$

If the eigenvalues are ranked in descending order, $\lambda 1$ is greater than $\lambda 2$, which means that the eigenvector that corresponds to the first principal component (PC1) is v1 and the one that corresponds to the second component (PC2) is v2.

After determining the principal components in the step S4, the step S5 of PCA processing may be performed to compute the percentage of variance or information accounted for by each component. The percentage of variance accounted for by each component may be determined by dividing the eigenvalue of each component by the sum of eigenvalues. Based on the above example, it may be determined that PC1 and PC2 capture, respectively, 96% and 4% of the variance of the original data set.

Following the step S5, the step S6 may be performed to select which one or more principal components to retain and use to form the transformed resulting data set having reduced dimensionality. The step S4 generated a ranked list of principal components in order of significance. Now in the step S5, processing may be performed to decide which one or more principal components, if any, may be discarded. Generally, one or more principal components may be discarded where the remaining principal components are used to form a matrix of vectors also referred to as the feature vector. The feature vector may be formed as a matrix having as its columns the non-discarded or retained eigenvectors. Continuing with the example from the a feature vector may be formed with both of the eigenvectors v1 and v2:

$$\begin{bmatrix} 0.6778736 & -0.7351785 \\ 0.7351785 & 0.6778736 \end{bmatrix}$$

Alternatively, the eigenvector v2, which is the one of lesser significance, may be discarded and the feature vector may be formed with v1 only as follows:

$$\begin{bmatrix} 0.6778736 \\ 0.7351785 \end{bmatrix}$$

In this example, discarding v2 reduces the dimensionality by 1 and does cause a loss of information in the resulting data set. However, since v2 only capture 4% of the variance or information, the loss may be insignificant and not important since 96% of the variance or information is captured by v1.

Following the step S6, the step S7 of PCA processing may be performed to use the feature vector formed using the eigenvectors of the covariance matrix, to transform the original data set by reorienting the data from the original axes to the ones represented by the principal components. This transformation may be done by multiplying the transpose of the original data set by the transpose of the feature vector.

In connection with a further example, consider the tier distribution denoted by a vector of 3 percentages for the 3 storage tiers, tier 1, tier, and tier 3, as discussed above. The original data set S1 obtained in the step 502 includes multiple tier distributions each having 3 percentages where the original data set may be characterized as having 3 dimensions or variables. In at least one embodiment, each tier distribution in the original data set S1 may denote a tier distribution for one data storage system and the data set may include multiple tier distributions for data storage systems of multiple customers. Applying PCA with respect to the original data set S1 having 3 dimensions may result in generating a resulting data set having only 2 dimensions as represented by the graph 610 of FIG. 6. Applying PCA to the original data set S1 of tier distributions for 3 storage tiers may indicate, for example, that less than 1% of the variance is captured by the third principal component that has been omitted. Thus, discarding this third principal component results in a loss of minimal information or variance.

Referring back to FIG. 5, after completing the step 504, control proceeds to the step 506 where processing may be performed to cluster the resulting data set having the reduced dimensionality (i.e., reduced dimensionality relative to the original data set). In at least one embodiment, a clustering algorithm may be used to determine K clusters of tier distributions using the resulting data set having the reduced dimensionality. For each cluster, a tier distribution is determined based on the individual tier distributions of the cluster. The clusters denote different candidate tier distributions that may be recommended as optimal tier distributions for different workloads. In at least one embodiment, the clustering algorithm may be the K-means clustering algorithm where a value may be determined for K using the elbow technique. Generally, determining clusters of data points in the step 506 may be determined using any suitable technique.

Unsupervised learning generally refers to the use of algorithms to identify patterns in data sets containing data points that are neither classified nor labeled. Cluster analysis is a type of unsupervised machine learning that groups data that has not been labelled, classified or categorized. Clustering algorithms include a first type or class in which an input to the algorithm is the specified number of clusters to be discovered by the algorithm. A second type or class of clustering algorithms is where the number of clusters to be produced or discovered by the algorithm is not provided as an input. Rather, with the second type, the algorithm selects the number of clusters generated. Generally, any suitable clustering algorithm of either type may be used with the techniques herein.

In at least one embodiment, an algorithm of the first type of clustering algorithm noted above may be used in the step 506 as noted above where the algorithm is the K-Means algorithm, also known and referred to as Lloyd's algorithm. K-means is a clustering algorithm that partitions a set of points into K sets or clusters) such that the points in each cluster tend to be near each other in the plane or clustering space dimensions. In connection with the application or use herein, each such point may be a point in the resulting data set generated by the step 504.

Generally, the K-Means algorithm is an iterative method of cluster analysis. Initially, for a given K value, wherein "K" is the number of specified clusters to be generated or discovered by the algorithm, K random points in the plane are chosen to be the cluster centers, or centroids. Each input data point is assigned to the cluster whose centroid is closest to that point, based on Euclidean distance. Next, a new centroid is calculated for each cluster based on the mean of all the points previously assigned to that cluster. This process is repeated until convergence (e.g., centroids do not change possibly within some specified tolerance or threshold conditions), or until a specified maximum number of iterations is reached. The K-Means algorithm is well known and is described in more detail, for example, in "An Efficient k-Means Clustering Algorithm: Analysis and Implementation", Kanungo et al., IEEE Transactions on Pattern and Analysis and Machine Intelligence, Col. 24, No. 7. July 2002; and as described in the text book "Data Clustering: Algorithms and Applications", Edited by Charu C. Aggarwal, Chandan K. Reddy, Chapman and Hall/CRC Data Mining and Knowledge Discovery Series, First Edition, CRC Press, Taylor and Francis Group, L L C, 2014, ISBN-13: 978-1466558212 and ISBN-10: 1466558210; and "A comparative study of efficient initialization methods for the k-means clustering algorithm", Celebi et al, Expert Systems with Applications, Volume 40, Issue 1, January 2013, Pages 200-210.

Figure 6:
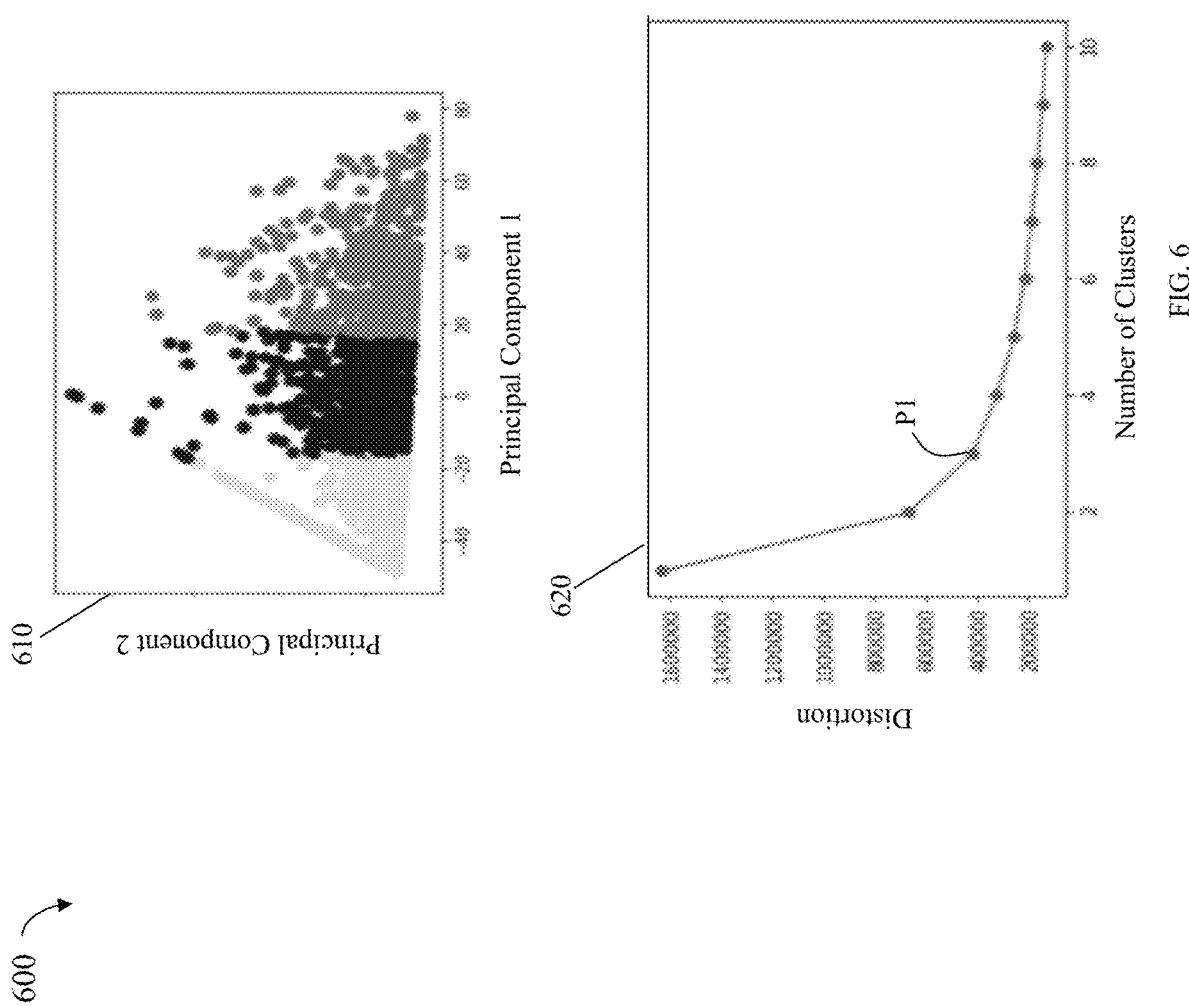
FIG. 6 includes graphs that may be generated and used in connection with Principal Component Analysis (PCA) in an embodiment in accordance with the techniques herein.

The elbow method or technique generally runs K-means clustering on the dataset for a range of values for K, such as from 1-10, and then for each value of K computes an average score for all identified clusters. In at least one embodiment, a distortion score may be computed for each value of K in the range as the sum of square distances from each point to its assigned center. To determine the optimal number of clusters, the elbow technique provides for selecting the value of K at the "elbow" or at the point after which the distortion score starts decreasing in a linear fashion. To further illustrate, reference is made to the graph 620 of FIG. 6 illustrating the distortion score on the Y axis as determined when using different values for K, the number of clusters, as denoted by the X axis. In the example 620, it can be observed that the distortion score may be characterized as decreasing in a linear manner for values of K larger than 3 as denoted by the point P1. Thus for the given data, it may be concluded that the optimal number of clusters for the data is 3 as denoted by the point P1. Referring to FIG. 6, the graph 610 may denote the 3 clusters identified by the different shading of the points in each cluster.

In connection with the example with tier distributions for 3 storage tiers, each identified cluster may denote a tier distribution of 3 percentages determined as an average or mean of the individual tier distribution points in the cluster. Each cluster represents similar tier distributions across multiple data storage systems of multiple customers. In at least one embodiment performing K-means clustering, the tier distribution for a cluster may be determined based on the average or mean of all the data points in the cluster.

For purposes of illustration, assume that the 3 clusters identified have the following 3 optimal tier distributions in the below Table 1:

|  | Tier 1 extreme performance | Tier 2 Performance | Tier 3 capacity |
|---|---|---|---|
| Cluster 1 | 8.6640 | 29.9496 | 61.3930 |
| Cluster 2 | 9.3365 | 53.8607 | 36.8568 |
| Cluster 3 | 6.2504 | 8.42467 | 85.3276 |

The foregoing 3 optimal tier distributions of Table 1 may be candidates from which a selection may be made when providing a recommendation to a customer who is configuring a new data storage system or otherwise reconfiguring an existing data storage system. In at least one embodiment, one or more of the 3 optimal tier distributions may be selected in accordance with the performance requirements or demands of the applications issuing the I/Os to the data storage system. For example, in the above Table 1, cluster 1's tier distribution may be selected for data storage systems used by applications or other clients requiring average I/O performance; cluster 2's tier distribution may be selected for data storage systems used by applications or other clients that are sensitive to I/O performance thereby desiring good I/O performance; and cluster 3's tier distribution may be selected for data storage systems that are not sensitive to performance.

A customer may be configuring a data storage system and a recommended tier distribution, such as from the 3 candidates tier distribution of Table 1, may be selected based on the expected usage of the system. For example, the applications storing their data on the data storage system may be primarily backup applications storing backup data on the system where the backup applications are not sensitive to performance. In this case, the tier distribution of cluster 3 from the Table 1 may be selected for configuring the data storage system. Using the selected cluster 3 tier distribution, processing may be performed to provide further information regarding a recommendation of a drive configuration and count as well as the expected or theoretical maximum IOPS for data storage system drive configuration. In at least one embodiment, the customer may provide as an input the desired user data storage capacity, such as 100 TB (terabytes), for the data storage system. Based on the provided user data storage capacity, the selected cluster 3's tier distribution may be used to calculate the potential drive count and the expected or theoretical maximum IOPS for the system.

Figure 7:
FIG. 7 is an example of information that may be generated in accordance with a selected tier distribution in an embodiment in accordance with the techniques herein.
Figure 8:
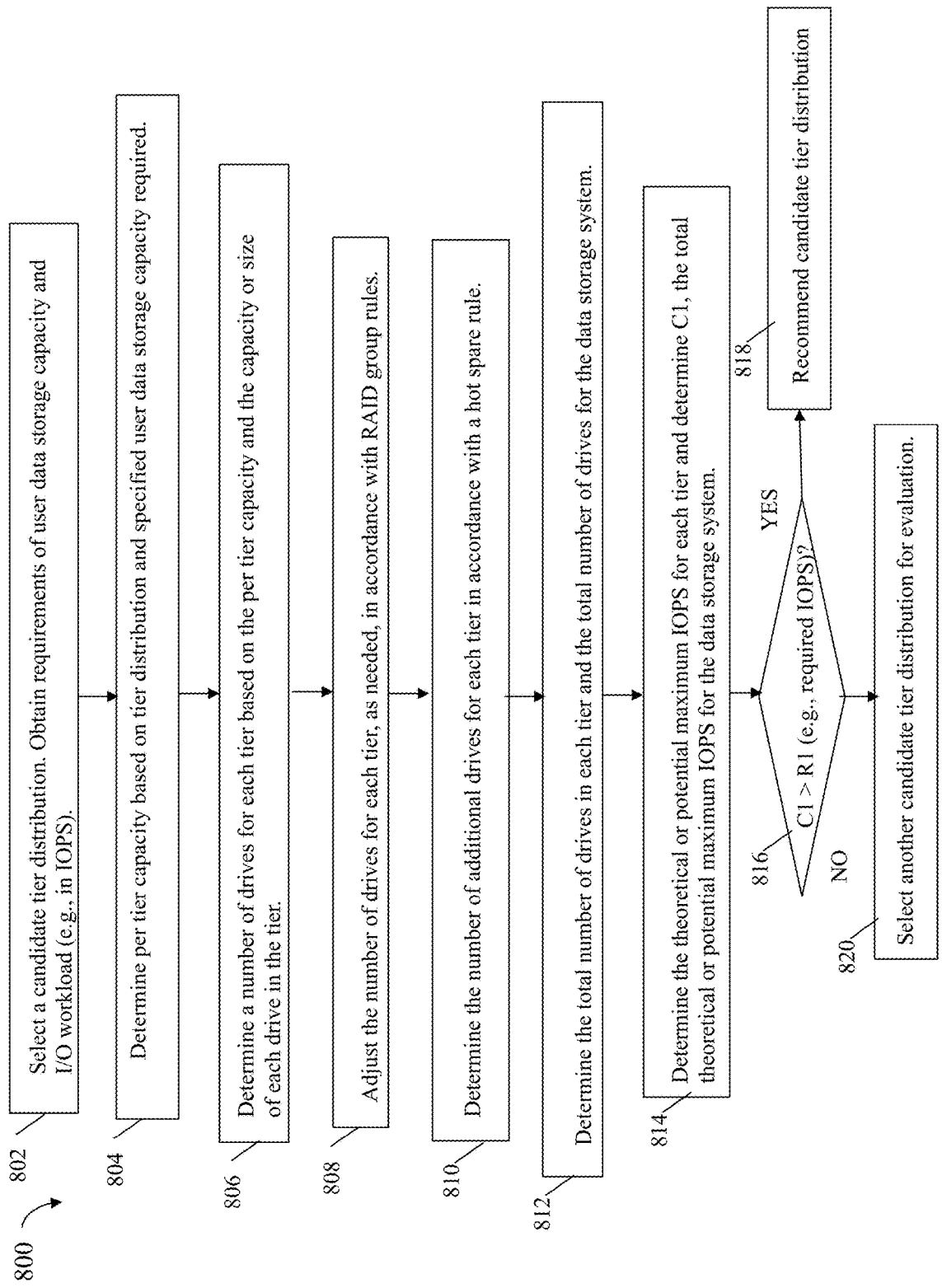

What will now be described with reference to FIGS. 7 and 8 is processing that may be performed in an embodiment to calculate the potential drive count and the expected or theoretical maximum IOPS for the system based on the provided user data storage capacity of 100 TB and the selected cluster 3's tier distribution.

Referring to the flowchart 800 of FIG. 8, at the step 802, a candidate tier distribution may be selected such as the tier distribution of cluster 3 of the Table 1 above. Additionally, in the step 802, inputs may be provided including the required user data storage capacity, such as 100 TB, and a required number of IOPS, R1, denoting the expected or estimated I/O workload of the data storage system.

Referring to FIG. 7, shown is an example 700 of information and calculations that may be used to determine the potential drive count and the expected or theoretical maximum IOPS for the system based on the provided user data storage capacity of 100 TB and the selected cluster 3's tier distribution in an embodiment in accordance with the techniques herein.

The table 700 includes 3 columns 716a-c corresponding respectively to the 3 storage tiers of capacity or tier 3, extreme performance or tier 1 and performance or tier 2 as described elsewhere herein. The row 702 includes the tier distribution percentages of the selected cluster 3 tier distribution noted in the Table 1 above.

From the step 802, control proceeds to the step 804. At the step 804, processing may e performed to determine the per-tier capacity based on the selected candidate tier distribution and R1=100 TB, the specified user data storage capacity required. In the step 804, the user data storage capacity of each of the 3 tiers 716a-c may be determined by multiplying each of the percentages of the row 702 by 100 TB. As denoted by the entries 704a-c, the calculated capacity for the tier 3 or capacity tier is 85.32 TB (704a), the calculated capacity for the tier 1 or extreme performance tier is 6.25 TB (704b) and the calculated capacity for the tier 2 or performance tier is 8.42 TB (704c).

From the step 804 control proceeds to the step 806 where processing is performed to determine a number of drives for each tier based on the per tier capacity (as determined in the step 804) and the capacity or size of each driver in the tier. With reference to the example of FIG. 7, the step 804 processing may determine the number of drives as denoted by the row 706 for each of the 3 tiers 716a-c. The step 804 uses as an input the size or capacity provided by each of the different types of drives of the 3 storage tiers. Generally, an embodiment may use any suitable drives and associated sizes or capacities. For purposes of illustration, assume that following per drive sizes or capacities as denoted in the Table 2 below:

| Tier 1/Extreme Performance Tier | Tier 2/ Performance Tier | Tier 3/ Capacity Tier |
|---|---|---|
| 1.6 TB | 1.8 TB | 2 TB |

As denoted by the entry 706a for the capacity tier or tier 3, 43 drives is determined by the step 806 using the drive size of 2 TB. Note that the calculation of 85.32 TB/2 TB=42.66 which is rounded up to 43 to represent 43 drives. As denoted by the entry 706b for the extreme performance tier or tier 1, 4 drives is determined by the step 806 using the drive size of 1.6 TB. Note that the calculation of 6.25 TB/1.6 TB=3.9 which is rounded up to 4 to represent 4 drives. As denoted by the entry 706c for the performance tier or tier 2, 5 drives is determined by the step 806 using the drive size of 1.8 TB. Note that the calculation of 8.42 TB/1.8 TB=4.7 which is rounded up to 5 to represent 5 drives.

From the step 806, control proceeds to the step 808 where processing is performed to adjust the number of drives for each tier (as determined in the step 806), as needed, in accordance with RAID group rules. In at least one embodiment, user data may be stored on the data storage system on BE PDs which are configured in RAID groups. In such an embodiment, each tier may include one or more RAID groups having a RAID level selected based on the particular tier. Thus, the actual amount of physical storage consumed for storing 1 TB of user data is greater than 1 TB and also varies with the particular RAID group configuration of each tier. As such, following the step 806, the step 808 may be performed which further adjusts the number of drives of the row 706 to account for the additional storage needed based on the RAID group rules for the RAID group configurations of the different storage tiers 716-c. For purposes of illustration, assume a RAID group rule indicates that the tiers 1 and 2 (corresponding respectively to the extreme performance tier 716b and the performance tier 716c) include drives configured into RAID-5 groups having a 4+1 configuration (e.g., where each RAID group includes 5 drives where 4 drives store user data and 1 drive stores parity information. Also assume another RAID group rule indicates that the tier 3 (corresponding to the capacity tier 716a) includes drives configured into RAID-6 groups having a 6+2 configuration (e.g., where each RAID group includes 8 drives where 6 drives store user data and 2 drives store parity information.

In connection with the example of FIG. 7, the step 808 determines the adjusted number of drives needed for each tier in the row 708 based on the above RAID group configurations and RAID group rules. To illustrate, consider the tier 3 or the capacity tier 716a. The step 808 processing may adjust the number of 43 drives (as denoted by the entry 706a) based on the RAID 6 configuration of 6+2. In this case, each RAID-6 group contains 8 drives so that the number of drives in tier 3 must be a multiple of 8. Additionally, the 43 drives of the entry 706a denotes the estimated amount of raw capacity needed for storing user data without counting for an additional capacity needed for storing parity information of each configured RAID group. The current drive count of 43 drives is first adjusted upward to 48 to be a multiple of 6 based on 6 drives per RAID group storing user data. Thus 48 drives are needed with a RAID-6 configuration of 6+2 to store user data. The step 808 now also determines that 16 additional parity drives are needed to store parity data when there are 48 drives for storing user data (e.g., 8 RAID-6 groups with a 6+2 configuration). Based on the foregoing, the step 808 determines that a total of 64 drives (e.g., 48+16) are needed for the tier 3 or capacity tier 716a of RAID-6 groups.

Further now consider the tier 1 or the extreme performance tier 716b. The step 808 processing may adjust the number of 4 drives (as denoted by the entry 706b) based on the RAID 5 configuration of 4+1. In this case, each RAID-5 group contains 5 drives so that the number of drives in tier 1 must be a multiple of 5. Additionally, the 4 drives of the entry 706b denotes the estimated amount of raw capacity needed for storing user data without counting for an additional capacity needed for storing parity information of each configured RAID group. The current drive count of 4 drives is first adjusted, as may be needed, to be a multiple of 4 based on 4drives per RAID group storing user data. In this case, the existing number of 4 drives of 706b is already a multiple of 4. Thus 4 drives are needed with a RAID-5 configuration of 4+1 to store user data. The step 808 now also determines that 1 additional parity drive is needed to store parity data when there are 4 drives for storing user data (e.g., 1 RAID-5 group 4+1 in the tier 1). Based on the foregoing, the step 808 determines that a total of 5 drives (e.g., 4+1) are needed for the tier 1 or extreme performance tier 716b of RAID-5 groups.

Further now consider the tier 2 or the performance tier 716. The step 808 processing may adjust the number of 5 drives (as denoted by the entry 706c) based on the RAID 5 configuration of 4+1. In this case, each RAID-5 group contains 5 drives so that the number of drives in tier 1 must be a multiple of 5. Additionally, the 5 drives of the entry 706c denotes the estimated amount of raw capacity needed for storing user data without counting for an additional capacity needed for storing parity information of each configured RAID group. The current drive count of 5 drives is first adjusted, as may be needed, to be a multiple of 5 based on 4 drives per RAID group storing user data. In this case, the existing number of 5 drives of 706c is adjusted upward to 8 (the next multiple of 4). Thus 8 drives are needed with a RAID-5 configuration of 4+1 to store user data. The step 808 now also determines that 2 additional parity drives are needed to store parity data when there are 8 drives for storing user data (e.g., 2 RAID-5 groups configured as 4+1 in the tier 2). Based on the foregoing, the step 808 determines that a total of 10 drives (e.g., 8+2) are needed for the tier 2 or performance tier 716c of RAID-5 groups.

Thus, the step 808 performs processing to adjust the number of drives per tier to account for the specified RAID group rules noted above. Following the step 808, the step 810 may be performed to apply a hot spare rule and adjust the number of drives per tier to account for the hot spare rule. In at least one embodiment, a hot spare rule of 1:30 specifies that an additional single drive is to be added for use as a potential spare for each 30 drives in a tier. As known in the art, a hot spare drive is one that may be swapped in for an existing failing drive. From the step 810, control proceeds to the step 812 where processing is performed to determine the total number of drives in each tier and the total number of drives for the data storage system.

Continuing with the example of FIG. 7, the step 810 applies the hot spare rule of 1:30 for the tier 3 or the capacity tier 716a and determines that an additional 3 drives (710a) are needed based on the 64 drives denoted by the entry 708a for a total number of 67 drives (712a) for the tier 3 or capacity tier 716a. The step 810 applies the hot spare rule of 1:30 for the tier 1 or the extreme performance tier 716b and determines that an additional 1 drive (710b) is needed based on the 5 drives denoted by the entry 708b for a total number of 6 drives (712b) for the tier 1 or extreme performance tier 716b. The step 810 applies the hot spare rule of 1:30 for the tier 2 or the performance tier 716c and determines that an additional 1 drive (710c) is needed based on the 10 drives denoted by the entry 708c for a total number of 11 drives (712c) for the tier 2 or performance tier 716b. The hot spare rule used in the step 810 as well as the RAID group rules used in the step 808 may be determined in accordance with best practices.

The step 812 processing in the example of FIG. 7 may calculate the total number of drives recommended for the storage configuration of the data storage system by adding the total drive counts of all the tiers of the row 712. In this example, the total drive count is 84 drives.

From the step 812, control proceeds to the step 814 where processing may be performed to calculate the theoretical or potential maximum IOPS for each tier based on a theoretical or potential maximum of IOPS per drive and also calculate the theoretical or potential maximum IOPS for the data storage system. In at least one embodiment, the theoretical or potential maximum per drive may vary with each type of drive based on the particular drive characteristics (e.g., for HDDs, the speed or RPM of the drive; for flash drives, the drive technology such as SLC or MLC). The theoretical or potential maximum per drive may be determined in any suitable manner. For example, the theoretical or potential maximum per drive may be a threshold, such as MAX0 described elsewhere herein, where if the I/O workload for the drive exceeds the threshold, the drive may be considered overloaded. For purposes of illustration, let X, Y and Z denote the theoretical or potential maximum per drive, respectively, for the tiers 716a-c. In this case, the step 814 may determine the potential maximum IOPS for each tier by simply multiplying the theoretical or potential maximum per drive by the number of drives in each tier as denoted by the entries 714a-c.

In the step 814 in connection with the example of FIG. 7, processing may be performed to calculate C1, the theoretical or potential total maximum IOPS for the data storage system, by adding the per tier amounts in the row 714.

From the step 814, control proceeds to the step 816 where a determination may be made as to whether C1, the calculated theoretical or potential total maximum IOPS as determined in the step 814, meets the specified required number of IOPS, R1. In at least one embodiment, a user or customer may also specify the required number of IOPS in addition to specifying the required storage capacity such as 1 TB in the above example. The required number of IOPS, R1, may denote an estimate of the average sustained I/O workload expected for the data storage system. In this case, the step 816 may compare R1 to C1 and determine whether C1 is greater than R1. If C1 is greater than R1, the step 816 may evaluate to yes and control may proceed to the step 818 to provide the selected candidate tier distribution denoted by the row 702 as a recommended tier distribution for the customer's data storage system. Otherwise, if the step 816 evaluates to no, control proceeds to the step 820 where a different one of the possible candidate tier distributions of one of the remaining clusters 1 and 2 may be selected for evaluation to determine whether the selected candidate tier distribution results in a storage configuration of drives having an associated theoretical or potential total maximum IOPS, C1, that meets R1, the specified required number of IOPS. In this case, processing of the flowchart of FIG. 8 may be repeated to evaluate another selected one of the remaining candidate tier distributions.

It should be noted that an embodiment may also use other criteria or requirements in connection with selecting a particular candidate tier distribution. The criteria or requirements may also consider cost. For example, processing may also be performed to determine C11, an estimated overall cost for the particular drive configuration determined by the processing of FIG. 8 such as denoted by the row 712 of FIG. 7. In at least one embodiment, the cost C11 may be presented to the user along with other information, such as the recommended candidate tier distribution and details regarding the drive configuration as in FIG. 7. A user may provide an upper bound or cost requirement, R2, as another input in the step 802. In this case, the step 816 may be modified to additionally consider the cost requirement R2 in accordance with the calculated cost C11. Thus, the step 816 may generally determine whether the one or more requirements R1 and R2 are met, where the step 816 evaluates to yes only if all/both the requirements R1 and R2 are met, and otherwise evaluates to no. Specifically, the step 816 may also compare C11 with R2 and determine whether C11 is less than R2. Thus, the step 816 may be modified to include the following expression: (C11<R2) and (C1>R1), where if the expression evaluates to yes or true, control proceeds to the step 818, and otherwise control proceeds to the step 820.

As another example, C11, the calculated cost for a drive configuration, may be used in connection with selecting from multiple drive configurations having associated theoretical or potential maximum IOPS that meet the specified R1. For example, the processing of FIG. 8 may be performed multiple times for multiple tier distributions and associated drive configurations meeting R1, the required I/O workload. Subsequently, additional processing may be performed to present to a user a ranked list of the multiple drive configurations meeting the I/O workload requirement R1, where the list is ranked based on the costs associated with the multiple drive configurations. For example, the list may be ranked from least cost to highest cost. Based on the foregoing ranked list, the drive configuration and tier distribution having the least cost may be recommended to the user or customer.

The criteria or requirements may also consider any requirements of a particular model or type of data storage system. Thus, an embodiment may perform additional rules or checks to ensure a drive configuration meets allowable constraints of a particular model or type of data storage system. For example, additional rules may be defined specifying a maximum number of allowable drives in a particular mode or type of data storage system. Prior to providing a recommendation for a particular drive configuration, processing may be performed to ensure that the total number of drives does not exceed the allowable maximum number. In at least one embodiment where the processing such as described in connection with FIGS. 7 and 8 may be used for multiple different data storage system models, a user or customer may provide another input denoting the particular data storage system model. The criteria or requirements may include additional rules and checks such as specifying a maximum number of allowable drives for the specified data storage model provided as the input.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining drive configurations comprising:
   determining that an existing tier distribution, of an existing data storage system, is non-optimal;
   and in response to determining that the existing tier distribution is non-optimal, reconfiguring the existing tier distribution, wherein said reconfiguring the existing tier distribution further comprises:
   receiving a data set including a plurality of tier distributions of a plurality of data storage systems;
   applying principal component analysis to the data set to generate a resulting data set, wherein the data set has a first number of dimensions and the resulting data set has a second number of dimensions less than the first number of dimensions;
   determining a plurality of clusters using the resulting data set, wherein each of the plurality of clusters includes a portion of the plurality of tier distributions, wherein each of the plurality of clusters has an associated cluster tier distribution determined in accordance with the portion of the plurality of tier distributions in said each cluster;
   selecting the associated cluster tier distribution of one cluster of the plurality of clusters;
   and performing first processing that determines, in accordance with a storage capacity requirement and in accordance with the associated cluster tier distribution of the one cluster of the plurality of clusters, a drive configuration.

2. The method of claim 1, wherein each of the plurality of data storage systems includes at least two storage tiers of physical storage devices.

3. The method of claim 2, wherein at least one of the plurality of data storage systems include a first plurality of storage tiers comprising rotating disk drives and non-volatile solid state storage devices (SSDs).

4. The method of claim 2, wherein at least one of the plurality of data storage systems include a second plurality of storage tiers and wherein each tier of the second plurality of tiers includes SSDs.

5. The method of claim 2, wherein each of the plurality of tier distributions is associated with a corresponding one of the plurality of data storage systems, and wherein said each tier distribution specifies a percentage of each of a plurality of storage tiers of said corresponding one of the plurality of data storage systems.

6. The method of claim 2, wherein the associated cluster tier distribution of each of the plurality of clusters specifies a plurality of percentages of a plurality of storage tiers, wherein each of the plurality of percentages denotes a percentage of one of the plurality of storage tiers.

7. The method of claim 1, further comprising:
determining a first expected I/O workload capability of the drive configuration; and
determining whether the first expected I/O workload capability meets a specified I/O workload requirement.

8. The method of claim 7, further comprising:
responsive to determining the first expected I/O workload capability meets the specified I/O workload requirement, recommending the associated cluster tier distribution of the one cluster of the plurality of clusters.

9. The method of claim 1, further comprising:
determining whether the drive configuration is in accordance with one or more requirements of a specified model of data storage system.

10. The method of claim 9, wherein the one or more requirements includes a requirement specifying a maximum number of allowable physical storage devices in the specified model of the data storage system.

11. The method of claim 1, wherein the drive configuration includes a first number of physical storage devices of a first storage tier and a second number of physical devices of a second storage tier different from the first storage tier.

12. The method of claim 1, further comprising:
determining an initial number of physical storage devices in each of a plurality of storage tiers in accordance with the storage capacity requirement; and
determining a revised number of physical devices in each of the plurality of storage tiers, wherein said determining the revised number includes adjusting the initial number of physical storage devices in each of the plurality of tiers in accordance with one or more spare rules and one or more RAID group rules.

13. The method of claim 1, wherein the existing tier distribution is determined to be non-optimal responsive to determining that the existing tier distribution includes a percentage for a storage tier and the percentage is not at least a specified minimum percentage.

14. The method of claim 1, wherein the existing tier distribution is determined to be non-optimal when a lowest performance tier of a plurality of tiers of the existing data storage system is determined to be overloaded.

15. A system comprising:
one or more processors;
and one or more memories comprising code stored thereon that, when executed, performs a method of determining drive configurations comprising:
determining that an existing tier distribution, of an existing data storage system, is non-optimal;
and in response to determining that the existing tier distribution is non-optimal, reconfiguring the existing tier distribution, wherein said reconfiguring the existing tier distribution further comprises:
receiving a data set including a plurality of tier distributions of a plurality of data storage systems;
applying principal component analysis to the data set to generate a resulting data set, wherein the data set has a first number of dimensions and the resulting data set has a second number of dimensions less than the first number of dimensions;
determining a plurality of clusters using the resulting data set, wherein each of the plurality of clusters includes a portion of the plurality of tier distributions, wherein each of the plurality of clusters has an associated cluster tier distribution determined in accordance with the portion of the plurality of tier distributions in said each cluster;
selecting the associated cluster tier distribution of one cluster of the plurality of clusters;
and performing first processing that determines, in accordance with a storage capacity requirement and in accordance with the associated cluster tier distribution of the one cluster of the plurality of clusters, a drive configuration.

16. A non-transitory computer readable medium comprising code stored thereon that, when executed, performs a method of determining drive configurations comprising:
determining that an existing tier distribution, of an existing data storage system, is non-optimal;
and in response to determining that the existing tier distribution is non-optimal, reconfiguring the existing tier distribution, wherein said reconfiguring the existing tier distribution further comprises:
receiving a data set including a plurality of tier distributions of a plurality of data storage systems;
applying principal component analysis to the data set to generate a resulting data set, wherein the data set has a first number of dimensions and the resulting data set has a second number of dimensions less than the first number of dimensions;
determining a plurality of clusters using the resulting data set, wherein each of the plurality of clusters includes a portion of the plurality of tier distributions, wherein each of the plurality of clusters has an associated cluster tier distribution determined in accordance with the portion of the plurality of tier distributions in said each cluster;
selecting the associated cluster tier distribution of one cluster of the plurality of clusters;
and performing first processing that determines, in accordance with a storage capacity requirement and in accordance with the associated cluster tier distribution of the one cluster of the plurality of clusters, a drive configuration.

17. The non-transitory computer readable medium of claim 16, wherein each of the plurality of data storage systems includes at least two storage tiers of physical storage devices.

18. The non-transitory computer readable medium of claim 17, wherein at least one of the plurality of data storage systems includes a first plurality of storage tiers comprising rotating disk drives and non-volatile solid state storage devices (SSDs).

* * * * *

UNITED STATES PATENT AND TRADEMARK OFFICE
CERTIFICATE OF CORRECTION

PATENT NO. : 11,372,561 B1
APPLICATION NO. : 17/112345
DATED : June 28, 2022
INVENTOR(S) : Bina K. Thakkar et al.

It is certified that error appears in the above-identified patent and that said Letters Patent is hereby corrected as shown below:

In the Claims

Column 32, Line 58:
In Claim 3, the phrase "storage systems include" should read -- storage systems includes --

Column 32, Line 62:
In Claim 4, the phrase "storage systems include" should read -- storage systems includes --

Signed and Sealed this
Twenty-third Day of August, 2022

Katherine Kelly Vidal
*Director of the United States Patent and Trademark Office*